(12) United States Patent
Hatao

(10) Patent No.: US 7,616,396 B2
(45) Date of Patent: Nov. 10, 2009

(54) DATA REPRODUCING APPARATUS AND DATA REPRODUCING METHOD

(75) Inventor: Yosuke Hatao, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 421 days.

(21) Appl. No.: 11/715,526

(22) Filed: Mar. 7, 2007

(65) Prior Publication Data

US 2007/0223881 A1    Sep. 27, 2007

(30) Foreign Application Priority Data

Mar. 7, 2006    (JP)    ............................. 2006-060568

(51) Int. Cl.
    *G11B 15/18* (2006.01)
(52) U.S. Cl. ........................................ 360/69
(58) Field of Classification Search .................. 360/69,
    360/31, 55, 71, 53, 54, 39; 370/535, 538,
    370/389; 375/240.14; 709/224
    See application file for complete search history.

(56) References Cited

U.S. PATENT DOCUMENTS

| 5,872,933 | A | 2/1999 | Kanai et al. |
| 6,219,381 | B1* | 4/2001 | Sawada et al. ......... 375/240.14 |
| 6,304,903 | B1* | 10/2001 | Ward .......................... 709/224 |
| 6,639,746 | B1* | 10/2003 | Chung et al. ................... 360/55 |
| 6,707,814 | B1* | 3/2004 | Ohgane ....................... 370/389 |
| 7,006,536 | B1* | 2/2006 | Somashekhar et al. ....... 370/538 |
| 7,110,197 | B2* | 9/2006 | Cho ............................. 360/31 |
| 7,400,657 | B2* | 7/2008 | Somashekhar et al. ....... 370/535 |
| 2006/0072228 | A1* | 4/2006 | Geerlings et al. ............. 360/31 |
| 2006/0083134 | A1 | 4/2006 | Matsuno et al. |

FOREIGN PATENT DOCUMENTS

| JP | A-9-051505 | 2/1997 |
| JP | 11-232774 | 8/1999 |
| JP | 2003-187517 | 7/2003 |
| JP | 2004-087052 | 3/2004 |
| JP | 2004-206775 | 7/2004 |
| JP | 2005-182970 | 7/2005 |
| JP | 2005-295586 | 10/2005 |
| JP | 2005-317099 | 11/2005 |

\* cited by examiner

*Primary Examiner*—Fred Tzeng
(74) *Attorney, Agent, or Firm*—Nutter McClennen & Fish LLP; John J. Penny, Jr.

(57) ABSTRACT

A header information acquiring section is operable to acquire header information of reproduction data to be reproduced from a hard disk. A bit rate information extracting section is operable to extract information on a bit rate at which the reproduction data is reproduced, from the acquired header information. A comparison section is operable to compare the extracted bit rate with a predetermined threshold value. A drive control section is operable to deactivate the hard disk and activate the deactivated hard disk based on the comparison result of the comparison section.

8 Claims, 7 Drawing Sheets

| BIT RATE (bps) | HDD RECOVERY TIMER (sec) (BUFFER SIZE 2 TO 4 MB) | HDD RECOVERY TIMER (sec) (BUFFER SIZE 4 TO 8 MB) |
|---|---|---|
| ~500k | 60 | 120 |
| 500k~750k | 50 | 100 |
| 750k~1000k | 40 | 80 |
| 1000k~1250k | 30 | 60 |
| ⋮ | ⋮ | ⋮ |

DATA REPRODUCING APPARATUS AND DATA REPRODUCING METHOD

The disclosure of Japanese Patent Application No. 2006-060568 fled Mar. 7, 2006 including specification, drawings and claims is incorporated herein by reference in its entirety.

BACKGROUND

The present invention relates to a data reproducing apparatus including a hard disk, which reproduces data stored in the hard disk, a data reproducing method.

In a related-art data reproducing apparatus equipped with a HDD (Hard Disk Drive), which can reproduce reproduction data such as video-audio data recorded in the HDD, the reproduction data is read from the HDD to a buffer memory, temporarily stored in the buffer memory and transferred from the buffer memory to a video decoder so that the data reproducing apparatus reproduces the reproduction data.

When a data transfer speed in reading the reproduction data from the hard disk to the buffer memory is different from a data transfer speed (a bit rate) in transferring the reproduction data from the buffer memory to the video decoder, there is provided a data reproducing apparatus which can reduce power consumption of the apparatus by deactivating the hard disk during a predetermined time (for example, see Japanese Patent Application No. 2004-87052A).

However, in the related-art data reproducing apparatus, the reading of reproduction data from a hard disk to a buffer memory may be delayed depending on a bit rate at the time of transferring the reproduction data from the buffer memory to the video decoder. In this case, the reproduction data to be transferred from the buffer memory to the video decoder runs short and frames of video data, for example, are dropped at the time of reproducing the reproduction data, thereby deteriorating a reproduction quality.

SUMMARY

It is therefore an object of the invention to provide a data reproducing apparatus, a data reproducing method which can reduce power consumption without a variation in reproduction quality at the time of reproducing the reproduction data stored in the hard disk In order to achieve the above described object, according to the invention, there is provided a data reproducing apparatus having a hard disk and operable to reproduce reproduction data stored in the hard disk, the data reproducing apparatus comprising:

a header information acquiring section operable to acquire header information of the reproduction data to be reproduced from the hard disk;

a bit rate information extracting section operable to extract information on a bit rate at which the reproduction data is reproduced, from the acquired header information;

a comparison section operable to compare the extracted bit rate with a predetermined threshold value; and a drive control section operable to deactivate the hard disk and activate the deactivated hard disk based on the comparison result of the comparison section.

With this configuration, the header information of the reproduction data stored in the hard disk is first read. The information on the bit rate extracted from the read header information is compared with the predetermined threshold value. And deactivating of the hard disk and activating of the deactivated hard disk can be controlled based on the comparison result. It is possible to suitably set a deactivation time period which is a time period between a time when the hard disk is deactivated and a time when the hard disk is activated in consideration of the bit rate representing an amount of data which can be reproduced per unit time. As a result, the data reproducing apparatus can control the deactivating of the hard disk and the activating of the deactivated hard disk while maintaining a reproduction quality at the time of reproducing the reproduction data. Since the electricity is not required during the hard disk is deactivated, it is possible to reduce the power consumption at the time of driving the data reproducing apparatus.

The drive control section may set a time period between a time when the hard disk is deactivated and a time when the deactivated hard disk is activated to a first time period in a case where the bit rate is a first rate; and the drive control section may set the time period to a second time period which is longer than the first time period in a case where the bit rate is a second rate which is smaller than the first rate.

With this configuration, in the data reproducing apparatus according to the invention, since the hard disk can be deactivated for the second time period which is longer than the first time period while maintaining the reproduction quality at the time of reproducing the reproduction data, it is possible to reduce the power consumption at the time of driving the data reproducing apparatus.

The data reproducing apparatus may further comprise a buffer memory capacity determining section operable to determine capacity of a buffer memory temporarily storing the reproduction data when the reproduction data is reproduced; wherein the drive control section is operable to deactivate the hard disk and activate the deactivated hard disk based on the determined capacity of the buffer memory.

With this configuration, the data reproducing apparatus can suitably set the deactivation time period of the hard disk in consideration of the capacity of the buffer memory for storing the bit rate and the reproduction data. Accordingly, the data reproducing apparatus can control the deactivating of the hard disk and the activating of the deactivated hard disk while maintaining the reproduction quality at the time of reproducing the reproduction data.

The drive control section may set a time period between a time when the hard disk is deactivated and a time when the deactivated hard disk is activated to a first time period in a case where the capacity is first amount; and the drive control section may set the time period to a second time period which is longer than the first time period in a case where the capacity is second amount which is larger than the first amount.

With this configuration, in the data reproducing apparatus, since the hard disk can be deactivated for the second time period which is longer than the first time period while maintaining the reproduction quality at the time of reproducing the reproduction data, it is possible to reduce the power consumption at the time of driving the data reproducing apparatus.

The drive control section may forcibly activate the deactivated hard disk based on a predetermined request signal.

With this configuration, in the data reproducing apparatus, when there is received the predetermined request signal by which the change of the deactivation time period (which is the time period between the time when the hard disk is deactivated and the time when the deactivated hard disk is activated) of the hard disk can be predicted, it is possible to forcibly activate the deactivated hard disk regardless of the deactivation time period. Accordingly, it is possible to maintain the reproduction quality at the time of reproducing the reproduction data.

The drive control section may not deactivate the hard disk in a case where the extracted bit rate is larger than the predetermined threshold value.

With this configuration, in the data reproduction apparatus, since the hard disk can be deactivated only when the deactivation time period is enough to effectively suppress the power consumption, it is possible to prevent an electromotive force at the time of activating the deactivated hard disk from being larger than the power consumption to be suppressed by deactivating the hard disk.

According to the invention, there is also provided a data reproducing method for reproducing reproduction data stored in a hard disk, the data reproducing method comprising:

acquiring header information of the reproduction data to be reproduced from the hard disk;

extracting information on a bit rate at which the reproduction data is transferred, from the acquired header information comparing the extracted bit rate with a predetermined threshold value;

deactivating the hard disk based on the comparison result; and activating the deactivated hard disk based on the comparison result.

According to the invention, there is also provided a program product comprising a recording medium having recorded a program operable to cause a computer to execute the above described method.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Embodiments (first and second embodiments) suitable for a data reproducing apparatus according to the invention will be described in detail with reference to the accompanying drawings.

(External Appearance of Data Reproducing Apparatus)

Figure 1:
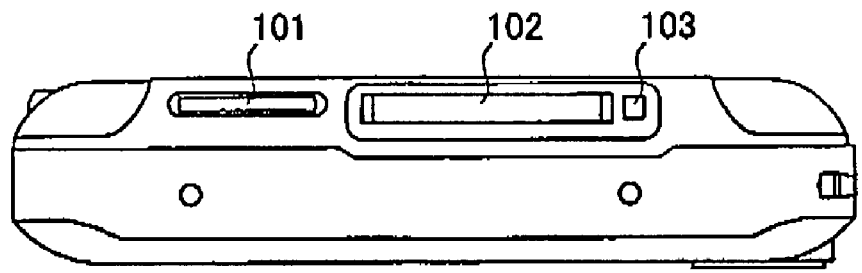
FIG. 1 is an schematic top view showing a data reproducing apparatus according to embodiments of the present invention.

As shown in FIG. 1, reference numeral 101 denotes a SDM memory card slot for inserting a SD memory card and an MMC (multimedia card), reference numeral 102 denotes a CF card slot for inserting a CF card and a micro drive, and reference numeral 103 denotes a CF card ejecting button pressed at the time of removing the CF card.

Figure 2:
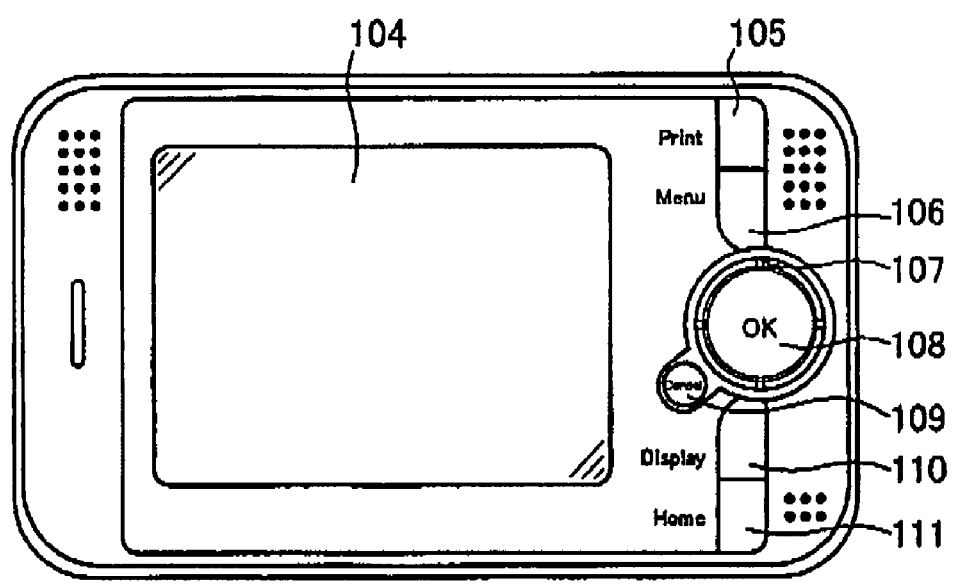
FIG. 2 is an schematic front view showing an external appearance of a data reproducing apparatus according to the embodiments.

As shown in FIG. 2, reference numeral 104 denotes an operating screen or a high-precision liquid crystal monitor (for example, 3.8-inch). Reference numeral 105 denotes a 'Print' button. When the 'Print' button 105 is pressed on a printable screen, a print setting screen is displayed Reference numeral 106 denotes a 'Menu' button. When the 'Menu' button 106 is pressed, executable operating items are displayed in pop-up menus. Reference numeral 107 denotes a '↑↓←→' key (a 4-Way ring). When the 4-Way ring 107 is pressed, the operating items can be selected. Reference numeral 108 denotes an 'OK' button. When the 'OK' button 108 is pressed, the selection is settled. Reference numeral 109 denotes a 'Cancel' button. When the 'Cancel' button 109 is pressed, the operation is stopped and a previous screen is displayed again.

Reference numeral 110 denotes a 'Display' button. When the 'Display' button 110 is pressed, an operating manual or screen information is displayed. Reference numeral 111 denotes a 'Home' button. When the 'Home' button 111 is pressed, the operation is stopped and a 'Home screen (an initial menu screen)' is displayed again.

(Hardware Configuration of Data Reproducing Apparatus)

Figure 3:
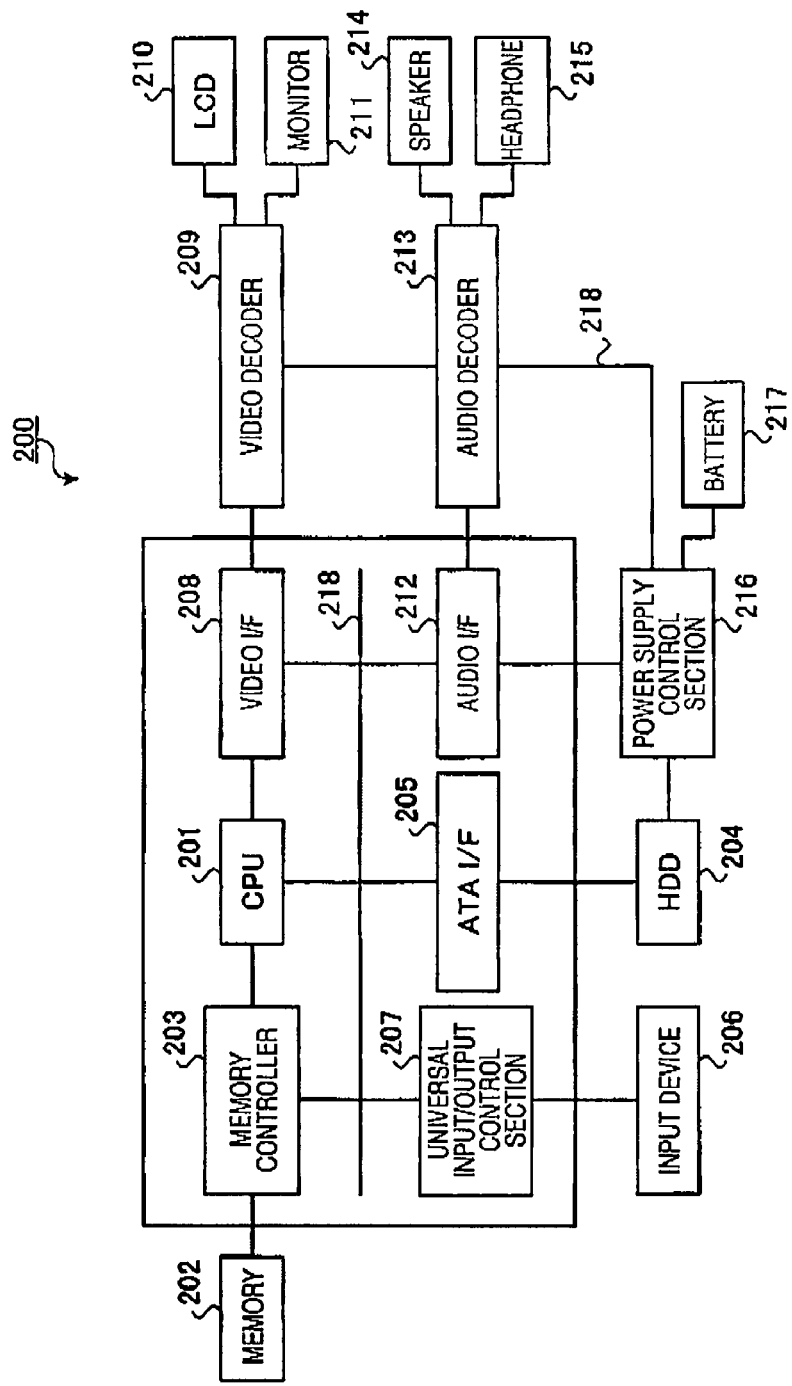
FIG. 3 is a block diagram showing a hardware configuration of the data reproducing apparatus.

As shown in FIG. 3, a data reproducing apparatus 200 includes a CPU 201, a memory 202, a memory controller 203, a HDD (Hard Disk Drive) 204, an ATA I/F (an interface) 205, an input device 206, a universal input/output control unit 207, a video I/F (an interface) 208, a video decoder 209, an LCD (a liquid crystal display) 210, a monitor 211, an audio I/F (an interface) 212, an audio decoder 213, a speaker 214, a headphone 215, a power supply control unit 216, and a battery 217. The above-described constituent members 201 to 217 are connected to each other via a bus 218.

Here, the CPU 201 controls the entire data reproducing apparatus 200 by executing programs stored in the memory 202 and the HDD 204. The memory 202 stores a basic processing program of the data reproducing apparatus 200. The memory 202 includes a ROM (Read Only Memory) or a SDRAM (Synchronous Dynamic Random Access Memory). The memory controller 203 controls the reading/writing operation of data from/in the memory 202 depending on the control of the CPU 201.

The HDD 204 stores a variety of information such as image data and a control program. Instead of the HDD 204 or in addition to the HDD 204, a storage device with removable storage media such as a DVD and a compact disk (CD) may be used. The HDD 204 is connected to the CPU 201 via the ATA I/F 205 and reading and writing operations of data stored in the HDD 204 are performed via the ATA I/F 205.

The input device 206 includes a variety of buttons for inputting characters, numeric values, and a variety of instructions, which are shown in FIG. 2. The universal input/output control unit 207 controls the input/output of the input device 206.

The video I/F 208 is connected to the LCD 210 and the monitor 211 via the video decoder 209. The video I/F 208 includes a graphic controller generally controlling the LCD 210 and the monitor 211, a buffer memory such as a VRAM (Video RAM) temporarily recording immediately displayable image information, and a control IC controlling a display on the LCD 210 and the monitor 211. In detail, in the video I/F 208, the image data output from the graphic controller is decoded by the video decoder 209 and the display on the LCD 210 and the monitor 211 is performed on the basis of the decoded image data.

The LCD 210 notifies a user of a status of the data reproducing apparatus 200 or of predetermined information (for example, warning information). The monitor 211 is a high-precision liquid crystal display using a liquid crystal and displays, for example, an icon, a cursor, a menu, a window, or various data such as characters or images.

The audio I/F 212 is connected to the speaker 214 and the headphone 215 via the audio decoder 213. In detail, audio data output from the audio I/F 212 is decoded by the audio decoder 213 and the decoded audio data is output from the speaker 214 and the headphone 215.

The power supply control unit 216 supplies electricity from the battery 217 to each constituent member when the power of the data reproducing apparatus 200 is changed to an "ON" state by the user. When the power of the data reproducing apparatus 200 is changed to an "OFF" state by the user, the supply of the electricity to each constituent member is ended.

First Embodiment

In the first embodiment, the reproduction data stored in the HDD 204 of the data reproducing apparatus 200 is reproduced. In the data reproducing apparatus 200, the reproduction data is read from the previously equipped HDD, but the reproduction data may be read from a recording medium which is removably mounted on the data reproducing apparatus 200 and mechanically driven in the data reproducing apparatus 200. Here, the term "removably mounted" includes integrally attaching the recording medium to a main body of the apparatus by electrically connecting the mechanically driven recording medium to the data reproducing apparatus 200.

(First Embodiment: Functional Configuration)

Figure 4:
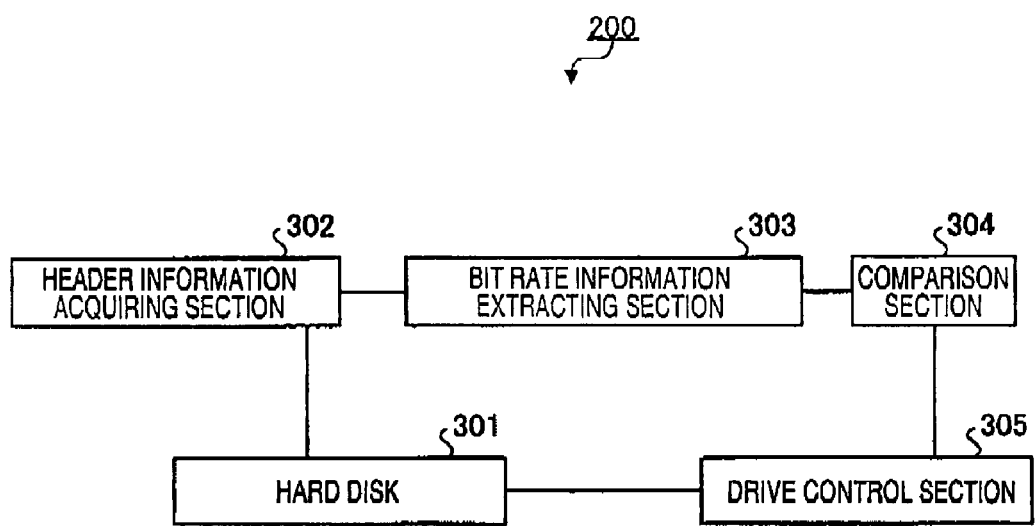
FIG. 4 is a block diagram showing a functional configuration of the data reproducing apparatus.

As shown in FIG. 4, the data reproducing apparatus 200 according to the first embodiment includes a hard disk 301, a header information acquiring section 302, a bit rate information extracting section 303, a comparison section 304, and a drive control section 305, and reproduces the reproduction data stored in the hard disk 301.

The header information acquiring section 302 acquires header information of the reproduction data to be reproduced from the hard disk 301. The header information includes information on the reproduction data added to the reproduction data. For example, the header information includes a reproduction method of the reproduction data, information indicating a data rate, and information on a bit rate described later.

The bit rate information extracting section 303 extracts the information on the bit rate at the time of reproducing the reproduction data, from the header information acquired by the header information acquiring section 302. The information on the bit rate includes information indicating an amount of data reproduced per unit time (n detail, 'one second') by the data reproducing apparatus 200 and information indicating an amount of the reproduction data read per unit time from the hard disk 301 and is expressed as "bps" (bit per second).

In detail, when the bit rate is '500 kbps', the reproduction data of 500 kbit is reproduced for one second. As the bit rate becomes higher, the amount of the reproduction data reproduced per unit time increases. Thus, an image quality is generally improved. Accordingly, the reproduction data (moving image data) acquired by photographing has different bit rates depending on a photographing status or the content of the moving image.

Figures 6, 7:
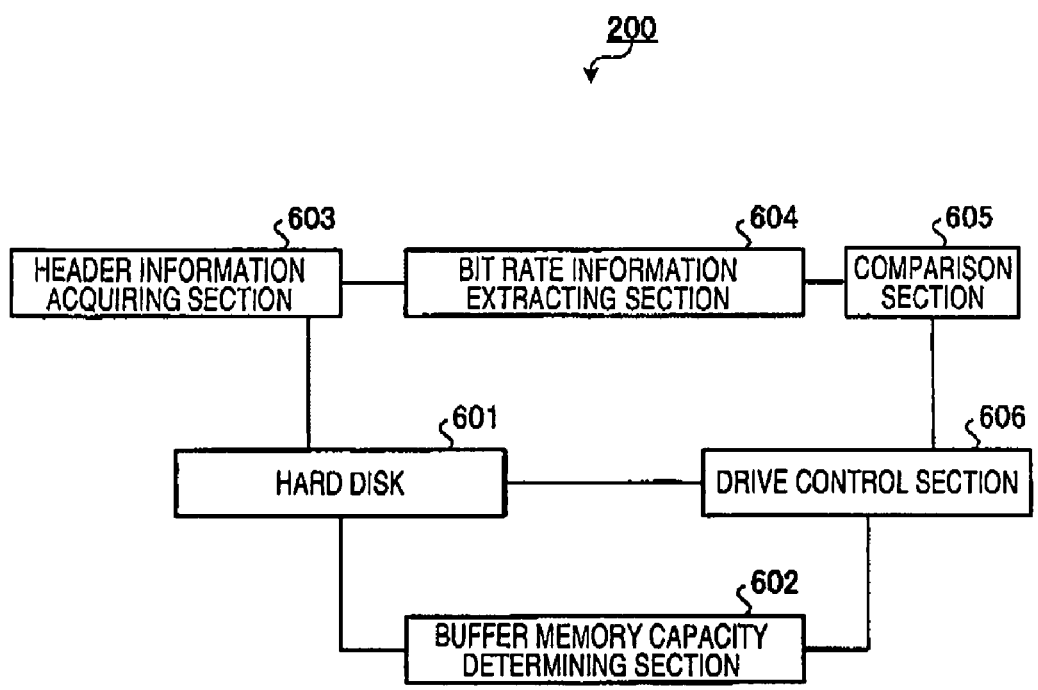
FIG. 6 is a diagram showing a relationship between a bit rate and a deactivation time period.
FIG. 7 is a block diagram showing a fictional configuration of the data reproducing apparatus according to a second embodiment of the present invention.

The comparison section 304 compares the bit rate extracted by the bit rate information extracting section 303 with a predetermined threshold value of a prefixed bit rate. At this time, the comparison is performed by using a table representing a relationship between the bit rate and the capacity of a buffer memory. For example, a below-mentioned table shown in FIG. 6 is used. In detail, when the capacity of the buffer memory secured in the memory 202 is fixed, the comparison is performed by using one of a HDD recovery parameter 501 and a HDD recovery parameter 502.

The drive control section 305 controls deactivating of the hard disk 301 and a recovery (activating) from the deactivating on the basis of a comparison result of the comparison section 304. Here, in detail, the deactivating of the hard disk 301 includes a stoppage in supplying power to the hard disk 301 (an entire unit) or a stoppage only in the rotation of a disk of the hard disk 301.

A method for deactivating the hard disk 301 is not limited to the above-described methods, but may include methods of suppressing the consumption of a battery amount through the reduction of the power consumption by rotating the disk of the hard disk 301 at a low speed and the removal of the power consumption consumed by the hard disk 301 by completely stopping the supply of electricity to the hard disk 301.

The recovery (activating) from the deactivating includes changing from a state of the deactivating of the hard disk 301, not only to a normal driving state but also to a state in which the normal driving state can be immediately executed. The normal driving state represents a state before the hard disk 301 is deactivated and a state where the disk rotates by supplying the power to the hard disk 301. The state in which the normal driving state can immediately executed represents a state where the rotation of the disk of the hard disk 301 is deactivated or the disk thereof is rotated at a low speed even though the power is supplied to the hard disk 301.

In detail, when the bit rate extracted by the bit rate information extracting section 303 is '400 kbps' and the capacity of the buffer memory secured in the memory 202 is '3 MB (Mega Byte)', the comparison is performed by using the HDD recovery parameter 501 of a table shown in FIG. 6 and the drive control section 305 deactivates the hard disk 301 for '60 seconds' on the basis of the comparison result.

As the comparison result of the comparison section 304, as the bit rate extracted by the bit rate information extracting section 303 decreases, the drive control section 305 elongates a time period between a time when the hard disk 301 is deactivated and a time when the hard disk 301 is recovered. In detail, as shown in FIG. 6, when the capacity of the buffer memory secured in the memory 202 is '3 MB', in a case where the extracted bit rate is '1100 kbps' the time period is set to '30 seconds', and in a case where the extracted bit rate is '600 kbps' the time period is set to '50 seconds' longer than the above time period (30 seconds for the bit rate of 1100 kbps).

When the bit rate is low, the amount of data reproduced per unit time by the data reproducing apparatus 200 is small. Therefore, it takes much time to end the reproduction of the entire reproduction data read from the hard disk 301 and temporarily stored in the buffer memory. As a result, as the bit rate decreases, the hard disk 301 can be deactivated for a longer time in comparison with a case where the bit rate is increases.

The drive control section 305 forcibly recovers the hard disk 301 on the basis of a predetermined request signal even before the time period between the time when the hard disk 301 is deactivated and the time when the hard disk 301 is recovered elapses. The predetermined request signal includes signals requesting for deactivating the reproduction, for reproducing other reproduction data, and for fast forward (double speed reproduction or skip reproduction), rewind (return reproduction), reproduction by frames, and pause of currently reproduced reproduction data.

As described above, the deactivation time period (the time from the deactivating to the recovery) of the hard disk 301 is set on the basis of a prearranged reproduction completing time when all of the reproduction data temporarily stored in the buffer memory is reproduced. As the result, when there is received an interrupt request signal by which a change of the prearranged reproduction completing time can be predicted, it is necessary to cope with the content of the request signal by forcibly recovering the hard disk 301.

In detail, when there is received the predetermined request signal, the hard disk 301 is forcibly recovered even before the deactivation time period has been elapsed (in other words, during the deactivation time period). By verifying the content of the request signal, it is judged whether or not the hard disk 301 will be deactivated on the basis of the content. And in a case where it is judged that the hard disk 301 will be deactivated, it may be judged how long the hard disk 301 is deactivated The drive control section 305 controls the deactivating of the hard disk 301 so that the hard disk 301 is not deactivated when the bit rate extracted by the bit rate information extracting section 303 is larger than a predetermined threshold value as the comparison result of the comparison section 304. When the bit rate is larger than the predetermined threshold value, the amount of data reproduced per unit time by the data reproducing apparatus 200 is large. Therefore, even though the hard disk 301 is deactivated, the deactivation time period needs to be short. Accordingly, there is a case where it is judged that a merit (for example, suppressing the consumption of a battery amount) related to the power consumption of the hard disk 301 is small.

Some degree of electromotive force is required at the time of recovering the deactivated hard disk 301 (for example, rotating the disk). Accordingly, the power consumption at the time of not deactivating the hard disk 301 may be smaller than that at the time of deactivating the hard disk 301. Therefore, only when the deactivation time period is enough to effectively suppress the power consumption, the hard disk 301 is preferably deactivated.

In detail, the above-mentioned hard disk 301 serving as a part of the functional configuration of the data reproducing apparatus 200 implements its own function by the HDD 204 shown in FIG. 3. The header information acquiring section 302, the bit rate information extracting section 303, the comparison section 304, and the drive control section 305 implement their own functions when the CPU 201 shown in FIG. 3 executes a program stored in the memory 202 or the HDD 204.

(First Embodiment: Process Procedure)

Figure 5:
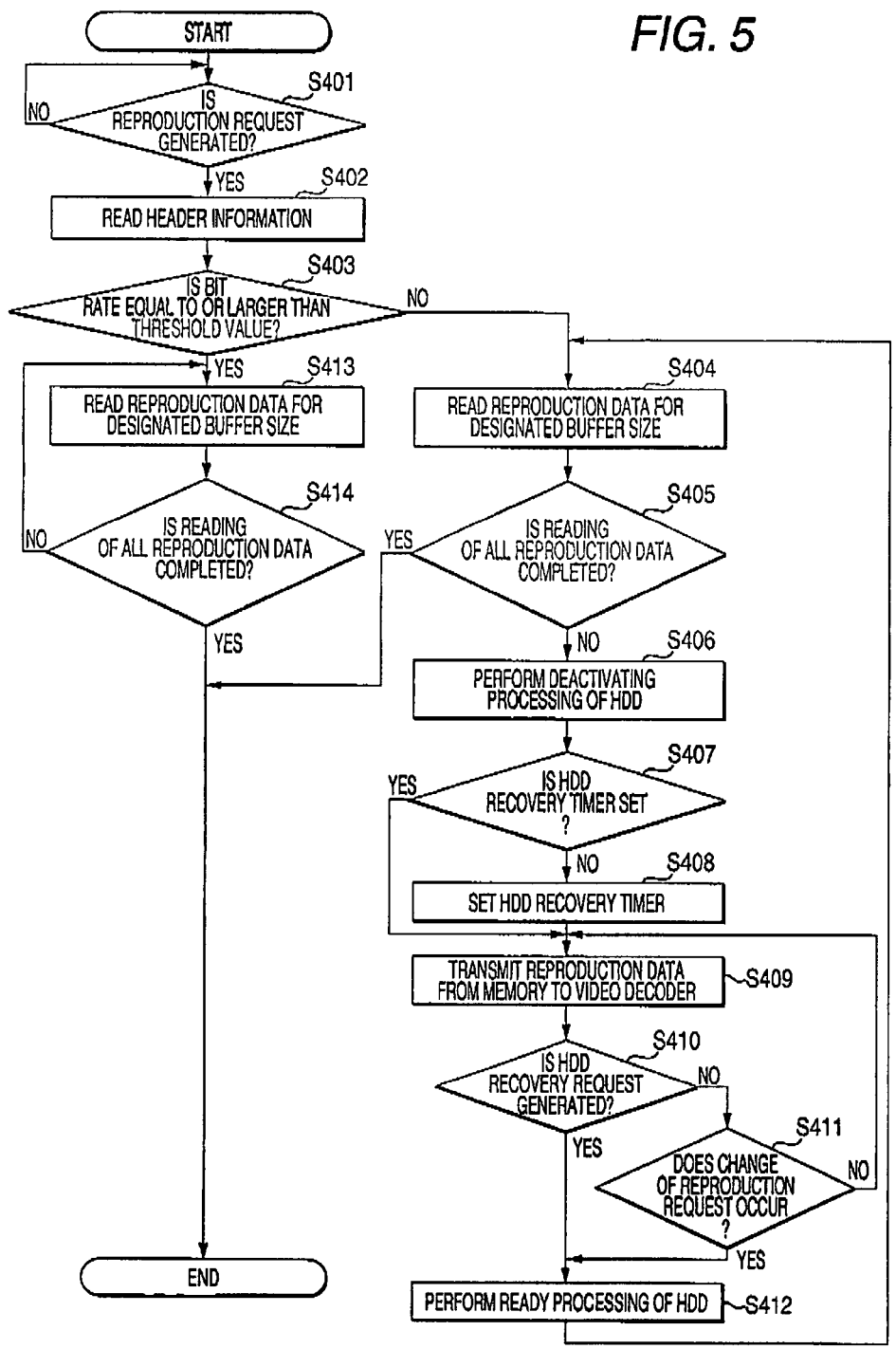
FIG. 5 is a flowchart showing a process procedure of the data reproducing apparatus according to a first embodiment of the present invention.

As shown in FIG. 5, the data reproducing apparatus 200 judges whether or not the request for reproducing the reproduction data stored in the HDD 204 is generated (step S401). The reproduction request is generated when the user manipulates the input device 206 or acquires signals (including both a wired signal and a wireless signal) from an external device.

In detail, when a 'Display' button 110 (see FIG. 2) is pressed by the user, the data reproducing apparatus 200 may judge that the request for reproducing the reproduction data is generated. Here, the reproduction data may include moving image data or audio data stored in the HDD 204. The reproduction data may include a 'slide show' on a still screen.

In step S401, it is awaited that the request for reproducing the reproduction data is generated. When the reproduction request is generated (step S401: Yes), the header information of the reproduction is read from the HDD 204 (step S402).

Next, the information on the bit rate at the time of reproducing the reproduction data is extracted from the header information read in step S402 and it is judged whether or not the bit rate is a threshold value (step S403).

Here, when the extracted bit rate is not equal to or larger than the threshold value (is less than the threshold value) (step S403: No), the reproduction data for a designated buffer size is, first of all, read from the HDD 204 (step S404). In detail, when the reproduction data stored in the HDD 204 is reproduced, the reproduction data for the designated buffer size is read from the HDD 204 and is temporarily stored in the memory 202.

Next, it is judged whether or not the reading of all reproduction data from the HDD 204 is completed (step S405). Here, when it is judged that the reading is not completed (step S405: No), a deactivating processing of the HDD 204 is performed (step S406).

It is judged whether or not a HDD recovery timer of the HDD 204 has been already set (step S407). When the HDD recovery timer is not set (step S407: No), the HDD recovery timer from a state where the HDD 204 is deactivated is set (step S408). The HDD recovery timer represents a time until the HDD 204 is activated again after the HDD 204 is deactivated. For example, when the recovery timer is set to 30 seconds, a HDD recovery request is generated 30 seconds after the HDD 204 is deactivated (step S410).

When the HDD recovery timer of an HDD 204 has been already set in step S407 (step S407: Yes) or when the HDD recovery timer is set in step S408, the reproduction data temporarily stored in the memory 202 is transmitted from the memory 202 to the video decoder 209 (step S409). By this configuration, the reproduction data is reproduced.

Next, it is judged whether or not the HDD recovery request from the state where the HDD 204 is dactivated is generated (step S410). In detail, when the set time of the HDD recovery timer elapses after the HDD 204 is deactivated, it is judged whether or not the HDD recovery request is generated.

Here, when the HDD recovery request is not generated (step S410: No), it is judged whether or not a change of the reproduction request occurs (step S411). When the change of the reproduction request does not occur (step S411: No), a series of processes of the flowchart are repeatedly performed in step S409.

When the HDD recovery request is generated in step S410 (step S410: Yes) or when the change of the reproduction request occurs in step S411 (step S411: Yes), a ready processing of the HDD 204 is performed (step S412). Next, a series of processes of the flowchart are repeatedly performed in step S404.

In detail, when the set time of the HDD recovery timer elapses after the HDD 204 is deactivated, the HDD 204 is activated again and the reproduction data read for the designated buffer size from the HDD 204 is temporarily stored in the memory 202. The ready processing section the starting preparation by supplying electricity to the HDD 204 so that the HDD 204 immediately performs some processes on the basis of the control of the CPU 201.

When the series of processes are repeated as the flow of processes goes to step S404 from step S412, it is judged again whether or not the reading of all reproduction data is completed (step S405) after reproduction data for a newly designated buffer size is read (step S404). When the reading of all reproduction data is not completed (step S405: No), the process of step S406 is performed as described above. When the reading of all reproduction data is completed (step S405: Yes), the read reproduction data all is reproduced and the series of processes are ended.

In step S403, when the extracted bit rate is equal to or larger than the threshold value (step S403: Yes), the reproduction data for the designated buffer size is, first of all, read from the HDD 204 similar to step S404 (step S413). It is judged whether or not the reading of all reproduction data from the HDD 204 is completed (step S414).

Here, when the reading of the reproduction data is completed (step S414: Yes), the read reproduction data is reproduced and the series of processes of the flowchart are ended. When the reading of the reproduction data is not completed (step S414: No), the process of step S413 is repeatedly performed.

That is, in step S403, when it is judged that the bit rate is equal to or larger than the threshold value (step S403: Yes), the reproduction data is reproduced without performing the deactivating processing of the HDD 204. When the reading of the all reproduction data stored in the HDD 204 is completed and the read reproduction data is reproduced, the series of processes of the flowchart are ended.

As described above, in the data reproducing apparatus 200 according to the first embodiment, the header information of the reproduction data to be reproduced is acquired from the hard disk 301 by the header information acquiring section 302 and the information on the bit rate at the time of reproducing the reproduction data is extracted from the acquired header information acquired by the bit rate information extracting section 303. The bit rate extracted by the bit rate information extracting section 303 is compared with a predetermined threshold value by the comparison section 304. The drive control section 305 can control the deactivating of the hard disk 301 and the recovery of the hard disk 301 (the activating of the deactivated hard disk 301).

The data reproducing apparatus 200 can set a deactivation time period of the hard disk 301 in consideration of the amount of data to be reproducible per unit time at the time of deactivating the hard disk 301. As the result, the data reproducing apparatus 200 can control the deactivating of the hard disk 301 and the recovery from the deactivating while maintaining the reproduction quality at the time of reproducing the reproduction data. Since the electricity is not required during the hard disk 301 is deactivated, it is possible to reduce the power consumption at the time of driving the data reproducing apparatus 200.

As the bit rate decreases, the drive control section 305 of the data reproducing apparatus 200 elongates the deactivation time period based on the comparison result of the comparison section 304. As the result, in the data reproducing apparatus 200, since the hard disk 301 can be deactivated for the longer time while maintaining the reproduction quality at the time of reproducing the reproduction data, it is possible to reduce the power consumption at the time of driving the data reproducing apparatus 200.

The drive control section 305 can recover the hard disk 301 on the basis of the predetermined request signal even before the deactivation time period of the hard disk 301 elapses. As the result, in the data reproducing apparatus 200, when there is received the interrupt request signal by which the change of the deactivation time period of the hard disk 301 can be predicted, it is possible to forcibly recover the hard disk 301 on the basis of the predetermined request signal, thereby maintaining the reproduction quality at the time of reproducing the reproduction data.

The drive control section 305 may allow the hard disk 301 not to be deactivated when the bit rate is larger than the predetermined threshold value as the comparison result of the comparison section 304. As the result, in the data reproduction apparatus 200, since the hard disk 301 is deactivated only when the deactivation time period is enough to effectively suppress the power consumption, it is possible to prevent an electromotive force at the time of recovering the hard disk 301 from being larger than the power consumption to be suppressed by deactivating the hard disk 301.

Second Embodiment

In the second embodiment, the HDD recovery timer representing the time from the deactivating to the recovery of the HDD 204 is additionally set on the basis of the buffer size and the bit rate at the time of reproducing the reproduction data by considering the size of a buffer temporarily storing the reproduction data read from the HDD 204 as well as the first embodiment. Here, the HDD recovery timer set on the basis of the buffer size and the bit rate will be described with reference to FIG. 6.

As shown in FIG. 6, there is provided the HDD recovery timer representing the time from the deactivating to the recovery of the HDD 204 depending on the bit rate at the time of reproducing the reproduction data. The HDD recovery timer includes the HDD recovery parameter 501 and the HDD recovery parameter 502 depending on the buffer size for temporarily storing the reproduction data.

The HDD recovery parameter 501 is set when the buffer size is in the range of 2 to 4 MB and the HDD recovery parameter 502 is set when the buffer size is in the range of 4 to 8 MB. In detail, when the bit rate at the time of reproducing the reproduction data is 600 kbps and the buffer size is 3 MB, the HDD recovery timer is set to 50 seconds for a bit rate of 600 kbps in the HDD recovery parameter 501.

Accordingly, as described above in the above-mentioned first embodiment, when the buffer size secured in the memory 202 is fixed, there may be provided an only table having one of the HDD recovery parameter 501 and the HDD recovery parameter 502.

(Second Embodiment; Functional Configuration)

As shown in FIG. 7, the data reproducing apparatus according to the second embodiment includes a hard disk 601, a buffer memory capacity determining section 602, a header information acquiring section 603, a bit rate information extracting section 604, a comparison section 605, and a drive control section 606, and reproduces the reproduction data stored in the hard disk 601.

The buffer memory capacity determining section 602 determines the capacity (size) of the buffer memory storing the reproduction data when the reproduction data stored in the hard disk 601 is reproduced The buffer memory serves as a storage area in which data can be temporarily stored. When reproducing the reproduction data stored in hard disk 601, the data reproducing apparatus temporarily stores the reproduction data in the buffer memory of the memory 202 and reads the reproduction data sequentially from the buffer memory to reproduce the reproduction data In detail, when the capacity of the buffer memory 202 in the data reproducing apparatus 200 is in the range of 2 to 8 MB, the buffer memory capacity determining section 602 determines the capacity of the buffer memory in the range of 2 to 8 MB.

Here, since the header information acquiring section 603, the bit rate information extracting section 604, and the comparison section 605 are the same as the header information acquiring section 302, the bit rate information extracting section 303, and the comparison section 304 described in the first embodiment, respectively, the descriptions thereof will be omitted.

The drive control section 606 controls a deactivating of the hard disk and a recovery of the deactivated hard disk 601 on the basis of the capacity of the buffer memory determined by the buffer memory capacity determining section 602 and the comparison result of the comparison section 605. For example, as the capacity of the buffer memory determined by the buffer memory capacity determining section 602 increases, the drive control section 606 elongates a time period between a time when the hard disk 601 is deactivated and a time when the deactivated hard disk 601 is recovered (activated).

Here, a detailed example of the control performed by the drive control section 606 will be described with reference to FIG. 6. First, the comparison section 604 compares parameters based on the bit rate extracted by the bit rate information extracting section 604 and the capacity of the buffer memory determined by the buffer memory capacity determining section 602. At this time, the comparison section 605 selects one of the HDD recovery parameter 501 and the HDD recovery parameter 502 provided by each capacity of the buffer memory, and compares values of the selected parameter.

In detail, when the bit rate extracted by the bit rate information extracting section 604 is '400 kbps' and the capacity of buffer memory determined by the buffer memory capacity determining section 602 is '3 MB', the comparison section 605 compares the extracted bit rate of '400 kbps' with the HDD recovery parameter 501. On the basis of the comparison result, the drive control section 606 sets the HDD recovery timer which represents the time period from the deactivating to the recovery of the hard disk 601 to '60 seconds'. In this case, the drive control section 606 recovers the hard disk 601 by restarting the hard disk 601 60 seconds after the hard disk 601 is deactivated.

When the bit rate extracted by the bit rate information extracting section 604 is '400 kbps' and the capacity of buffer memory determined by the buffer memory capacity determining section 602 is '5 MB', the comparison section 605 compares the extracted bit rate of '400 kbps' with the HDD recovery parameter 502. On the basis of the comparison result, the drive control section 606 sets the HDD recovery timer to '120 seconds'. In this case, the drive control section 606 recovers the hard disk 601 by restarting the hard disk 601 120 seconds after the hard disk 601 is deactivated.

The drive control section 606 recovers the hard disk 601 on the basis of the predetermined request signal even before the time from the deactivating to the recovery of the hard disk 601 elapses. The predetermined request signal includes a signal requesting for performing a double-speed reproduction of the reproduction data and a signal requesting for performing a skip reproduction of the reproduction data as described in the first embodiment.

In detail, the above-mentioned hard disk 601 serving as a part of the functional configuration of the data reproducing apparatus implements its own function by the HDD 204 shown in FIG. 3. The buffer memory capacity determining section 602, the header information acquiring section 603, the bit rate information extracting section 604, the comparison section 605, and the drive control section 606 implement their own functions when the CPU 201 shown in FIG. 3 executes a program stored in the memory 202 or the HDD 204.

(Second Embodiment: Process Procedure of Data Reproducing Apparatus)

Figure 8:
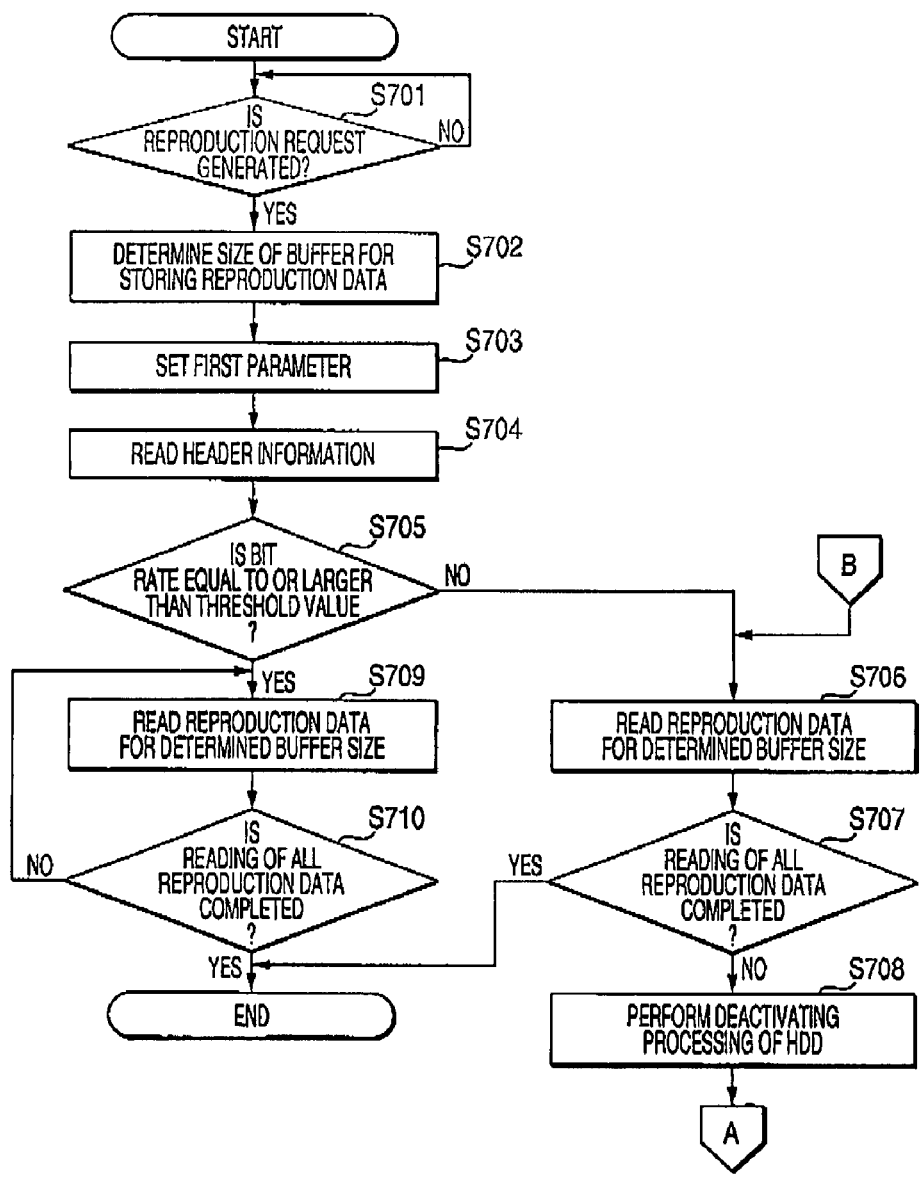
FIGS. 8 and 9 are a flowchart showing a process procedure of the data reproducing apparatus according to the second embodiment.

As shown in a flowchart shown in FIG. 8, the data reproducing apparatus 200 judges whether or not the request for reproducing the reproduction data stored in the HDD 204 is generated (step S701), Here, it is awaited that the request for reproducing the reproduction data is generated. When the reproduction request is generated (step S701: Yes), the size of a buffer for storing the reproduction read from the HDD 204 in the memory 202 is determined (step S702).

Next, a first parameter is set on the basis of the size of the buffer for storing the reproduction data determined in step S702 (step S703). The first parameter is a parameter determined depending on the size of the buffer for storing the reproduction data. For example, when the buffer size determined by the buffer memory capacity determining section 602 is 3 MB, the HDD recovery parameter 501 shown in FIG. 6 is set as a first recovery parameter and when the determined buffer size is 5 MD, the HDD recovery parameter 502 is set as the first recovery parameter.

The header information of the reproduction data is read from the HID 204 (step S704). The information on the bit rate at the time of reproducing the reproduction data is extracted from the read head information and it is judged whether or not the bit rate is equal to or larger than the threshold value (step S705).

Here, when the extracted bit rate is not equal to or larger than the threshold value (is less than the threshold value) (step S705: No), the reproduction data for the determined buffer size is read from the HDD 204 (step S706). In detail, when the reproduction data stored in the HDD 204 is reproduced, the reproduction data for the determined buffer size is read from the HDD 204 and is temporarily stored in the memory 202.

Next, it is judged whether or not the reading of all reproduction data from the HDD 204 is completed (step S707). Here, when it is judged that the reading is not completed (step S707: No), a deactivating processing of the HDD 204 is performed (step S708).

Figure 9:
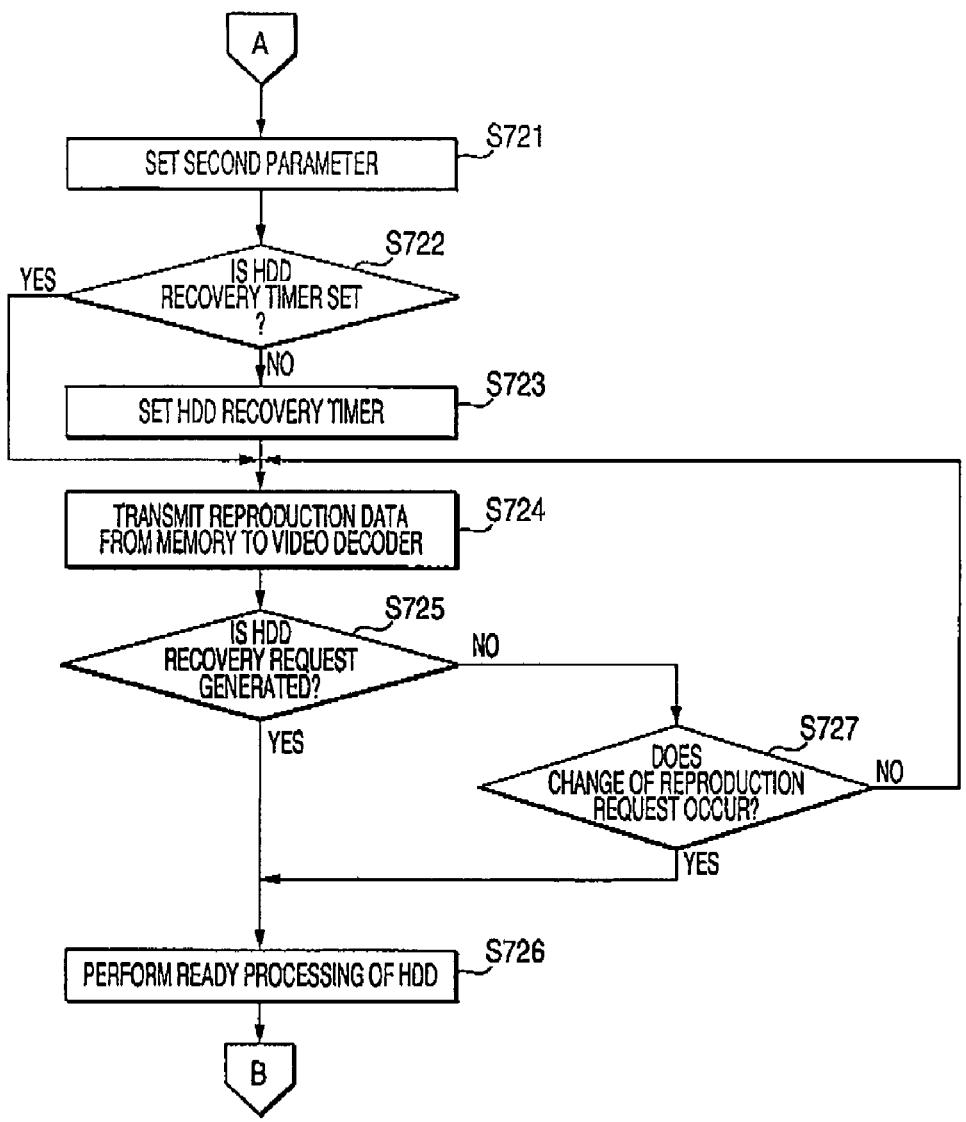

In step S708, when the deactivating processing of the HDD 204 is performed, the process of step S721 shown in the flowchart of FIG. 9 is performed. Next, a second parameter based on the bit rate extracted from the header information is set (step S721). It is judged whether or not the HDD recovery timer is set on the basis of the set second parameter and the first parameter set in step S703 shown in the flowchart of FIG. 8 (step S722).

Here, when the HDD recovery timer is not set (step S722: No), the HDD recovery timer from the deactivating of the HDD 204 is set (step S723). In detail, when the bit rate extracted from the header information is 800 kbps, the bit rate is involved in the range of the bit rate of 750 to 1000 kbps shown in FIG. 6. Accordingly, the range is set as a second HDD recovery parameter. When the HDD recovery parameter 502 is set as the first parameter in step S703, the HDD recovery timer is set to '80 seconds' on the basis of the first and second parameters.

Next, when the HDD recovery timer of the HDD 204 is set in step S722 (step S722: Yes) or when the HDD recovery timer is set in step S723, the reproduction data temporarily stored in the memory 202 is transmitted from the memory 202 to the video decoder 209 (step S724).

It is judged whether or not the HDD recovery request from the state where the HDD 204 is deactivated is generated (step S725). Here, when the HDD recovery request is not generated (step S725: No), it is judged whether or not a change of the reproduction request occurs (step S727). When the change of the reproduction request does not occur (step S727: No), a series of processes of the flowchart are repeatedly performed in step S724.

When the HDD recovery request is generated in step S725 (step S725: Yes) or when the change of the reproduction request occurs in step S727 (step S727: Yes), a ready processing of the HDD 204 is performed (step S726). Next, a series of processes shown in the flowcharts of FIGS. 8 and 9 are repeatedly performed in step S706 shown in the flowchart of FIG. 8.

In step S705, when the extracted bit rate is equal to or larger than the threshold value (step S705: Yes), the reproduction data for the determined buffer size is, first of all, read from the HDD 204 similar to step S706 (step S709). It is judged whether or not the reading of all reproduction data from the HDD 204 is completed (step S710).

Here, when the reading of the reproduction data is completed (step S710: Yes), the read reproduction data is reproduced and the series of processes of the flowchart are ended. When the reading of the reproduction data is not completed (step S710: No), the process of step S709 is repeatedly performed.

As described above, in the data reproducing apparatus 200 according to the second embodiment, the capacity of the buffer memory for storing the reproduction data can be determined by the buffer memory capacity determining section 602 at the time of reproducing the reproduction data. The header information of the reproduction data to be reproduced is acquired from the hard disk 601 by the header information acquiring section 603 and the information on the bit rate at the time of reproducing the reproduction data is extracted from the acquired header information acquired by the bit rate information extracting section 604. The bit rate extracted by the bit rate information extracting section 604 is compared with a prefixed threshold value by the comparison section 605. The drive control section 606 can control the deactivating and the recovery of the hard disk 601 on the basis of the capacity of the buffer memory determined by the buffer memory capacity determining section 602 and the comparison result of the comparison section 605.

As the result, the data reproducing apparatus 200 can set the deactivation time period of the hard disk 601 in consideration of the capacity of the buffer memory for storing the bit rate and the reproduction data. Accordingly, the data reproducing apparatus 200 can control the deactivating and recovery of the hard disk 601 while maintaining the reproduction quality at the time of reproducing the reproduction data.

As the capacity of the buffer memory increases, the drive control section 606 of the data reproducing apparatus 200 can elongate the deactivation time period between the time when the hard disk 601 is deactivated and the time when the deactivated hard disk 601 is recovered. As the result, in the data reproducing apparatus 200, since the hard disk 601 can be deactivated for the longer time while maintaining the reproduction quality at the time of reproducing the reproduction data, it is possible to reduce the power consumption at the time of driving the data reproducing apparatus 200.

What is claimed is:

1. A data reproducing apparatus having a hard disk and operable to reproduce reproduction data stored in the hard disk, the data reproducing apparatus comprising:
    a header information acquiring section operable to acquire header information of the reproduction data to be reproduced from the hard disk;
    a bit rate information extracting section operable to extract information on a bit rate at which the reproduction data is reproduced, from the acquired header information;
    a comparison section operable to compare the extracted bit rate with a predetermined threshold value; and
    a drive control section operable to deactivate the hard disk and activate the deactivated hard disk based on the comparison result of the comparison section.

2. The data reproducing apparatus as set forth in claim 1, wherein:
    the drive control section sets a time period between a time when the hard disk is deactivated and a time when the deactivated hard disk is activated to a first time period in a case where the bit rate is a first rate; and
    the drive control section sets the time period to a second time period which is longer than the first time period in a case where the bit rate is a second rate which is smaller than the first rate.

3. The data reproducing apparatus as set forth in claim 1, further comprising:
    a buffer memory capacity determining section operable to determine capacity of a buffer memory temporarily storing the reproduction data when the reproduction data is reproduced,
    wherein the drive control section is operable to deactivate the hard disk and activate the deactivated hard disk based on the determined capacity of the buffer memory.

4. The data reproducing apparatus as set forth in claim 3, wherein:
    the drive control section sets a time period between a time when the hard disk is deactivated and a time when the deactivated hard disk is activated to a first time period in a case where the capacity is first amount; and
    the drive control section sets the time period to a second time period which is longer than the first time period in a case where the capacity is second amount which is larger than the first amount.

5. The data reproducing apparatus as set forth in claim 1, wherein the drive control section forcibly activates the deactivated hard disk based on a predetermined request signal.

6. The data reproducing apparatus as set forth in claim 1, wherein the drive control section does not deactivate the hard disk in a case where the extracted bit rate is larger than the predetermined threshold value.

7. A data reproducing method for reproducing reproduction data stored in a hard disk, the data reproducing method comprising:
    acquiring header information of the reproduction data to be reproduced from the hard disk;
    extracting information on a bit rate at which the reproduction data is transferred, from the acquired header information
    comparing the extracted bit rate with a predetermined threshold value;
    deactivating the hard disk based on the comparison result; and
    activating the deactivated hard disk based on the comparison result.

8. A program product comprising a recording medium having recorded a program operable to cause a computer to execute the method as set forth in claim 7.

* * * * *